United States Patent
Wang et al.

(10) Patent No.: US 11,798,564 B2
(45) Date of Patent: Oct. 24, 2023

(54) SPOOFING DETECTION APPARATUS, SPOOFING DETECTION METHOD, AND COMPUTER-READABLE STORAGE MEDIUM

(71) Applicant: NEC Corporation, Tokyo (JP)

(72) Inventors: Qiongqiong Wang, Tokyo (JP); Kong Aik Lee, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/621,766

(22) PCT Filed: Jun. 28, 2019

(86) PCT No.: PCT/JP2019/025893
§ 371 (c)(1),
(2) Date: Dec. 22, 2021

(87) PCT Pub. No.: WO2020/261552
PCT Pub. Date: Dec. 30, 2020

(65) Prior Publication Data
US 2022/0358934 A1     Nov. 10, 2022

(51) Int. Cl.
*G10L 17/06* (2013.01)
*G10L 17/04* (2013.01)
*G10L 17/18* (2013.01)
*G10L 25/18* (2013.01)

(52) U.S. Cl.
CPC .............. *G10L 17/06* (2013.01); *G10L 17/04* (2013.01); *G10L 17/18* (2013.01); *G10L 25/18* (2013.01)

(58) Field of Classification Search
CPC ......... G10L 17/06; G10L 17/04; G10L 17/18; G10L 25/18; G10L 25/51; G10L 17/26
USPC ...................................................... 704/1–504
See application file for complete search history.

(56) References Cited

U.S. PATENT DOCUMENTS

| | | | | |
|---|---|---|---|---|
| 9,501,568 B2* | 11/2016 | Rafii | ....................... | G06F 16/61 |
| 10,515,262 B2* | 12/2019 | Morishita | ............ | G06V 40/172 |
| 10,593,336 B2* | 3/2020 | Boyadjiev | ............... | G06F 21/32 |
| 10,817,719 B2* | 10/2020 | Komatsu | ................ | G10L 25/27 |
| 2013/0282386 A1* | 10/2013 | Vilermo | ................ | G10L 19/008 |
| | | | | 704/500 |

(Continued)

FOREIGN PATENT DOCUMENTS

WO     2018/051945 A1     3/2018

OTHER PUBLICATIONS

International Search Report for PCT Application No. PCT/JP2019/025893, dated Sep. 10, 2019.

(Continued)

*Primary Examiner* — Marcus T Riley

(57) ABSTRACT

A spoofing detection apparatus 100 includes a multi-channel spectrogram creation unit 10 and an evaluation unit 40. The multi-channel spectrogram creation unit 10 extracts different type of spectrograms from speech data and integrates the different type of spectrograms to create a multi-channel spectrogram. The evaluation unit 40 evaluates the created multi-channel spectrogram by applying the created multi-channel spectrogram to a classifier constructed using labeled multi-channel spectrograms as training data and classifies it to either genuine or spoof.

18 Claims, 11 Drawing Sheets

(56) References Cited

U.S. PATENT DOCUMENTS

| | | | | |
|---|---|---|---|---|
| 2015/0088509 A1* | 3/2015 | Gimenez | ............... | G10L 17/22 |
| | | | | 704/243 |
| 2016/0196343 A1* | 7/2016 | Rafii | ............... | G06F 16/683 |
| | | | | 707/730 |
| 2017/0061246 A1* | 3/2017 | Chen | ............... | G06F 18/213 |
| 2018/0254046 A1 | 9/2018 | Khoury et al. | | |
| 2018/0299527 A1* | 10/2018 | Helwani | ............... | H04R 1/406 |
| 2019/0279644 A1 | 9/2019 | Yamamoto et al. | | |
| 2019/0355347 A1* | 11/2019 | Arik | ............... | G06N 20/20 |
| 2020/0035247 A1* | 1/2020 | Boyadjiev | ............... | G06F 21/32 |
| 2020/0046244 A1* | 2/2020 | Alam | ............... | G06N 3/045 |
| 2020/0111496 A1* | 4/2020 | Itakura | ............... | G06N 3/04 |
| 2020/0184054 A1* | 6/2020 | Storm | ............... | G06N 5/04 |
| 2020/0312336 A1* | 10/2020 | Kang | ............... | G06N 3/045 |
| 2020/0323484 A1* | 10/2020 | Aronovich | ............... | G10L 17/02 |
| 2020/0342234 A1* | 10/2020 | Gan | ............... | G06V 20/46 |
| 2021/0082438 A1* | 3/2021 | Zhao | ............... | G06N 3/08 |
| 2022/0036903 A1* | 2/2022 | Cilingir | ............... | G10L 17/04 |
| 2022/0335950 A1* | 10/2022 | Wang | ............... | G06N 3/08 |
| 2022/0358934 A1* | 11/2022 | Wang | ............... | G10L 25/51 |
| 2023/0020631 A1* | 1/2023 | Yang | ............... | H04R 3/04 |
| 2023/0053026 A1* | 2/2023 | Wucher | ............... | H04N 23/64 |

OTHER PUBLICATIONS

English translation of Written opinion for PCT Application No. PCT/JP2019/025893, dated Sep. 10, 2019.

Galina Lavrentyeva, et al. "Audio replay attack detection with deep learning frameworks", Interspeech 2017, Aug. 20-24, 2017, Stockholm, Sweden, pp. 82-86.

Liu Meng et al., "Replay Attack Detection Using Magnitude and Phase Information With Attention-Based Adaptive Filters", ICASSP 2019—2019 IEEE International Conference on Acoustics, Speech and Signal Processing (ICASSP), IEEE, pp. 6201-6205.

Muckenhirn Hannah et al., "Long-Term Spectral Statistics for Voice Presentation Attack Detection" IEEE/ACM Transactions on Audio, Speech, and Language Processing, IEEE, vol. 25, Issue: 11, Nov. 2017, pp. 2098-2111.

Extended European Search Report for EP Application No. 19935550.4, dated Jun. 27, 2022.

Jee-Weon Jung et al:"Replay attack detection with complementary high-resolution information using end-to-end DNN for the ASV spoof 2019 Challenge", arxiv. org, Cornell University Library, 201 Olin Library Cornell University Ithaca, NY 14853, Apr. 23, 2019, pp. 1-5.

Ricardo Reimao:"Synthetic Speech Detection Using Deep Neural Networks", May 31, 2019 (May 31, 2019), XP055725402, Retrieved from the Internet: URL:https://core.ac.uk/download/ pdf/240138805.pdf [retrieved on Aug. 26, 2020], p. 92-p. 119.

Weiping Zheng et al :"CNNs-based Acoustic Scene Classification using Multi-Spectrogram Fusion and Label Expansions", arxiv.org, Cornell University Library, 201 Olin Library Cornell University Ithaca, NY 14853, Sep. 5, 2018, pp. 1-7.

JP Office Action for JP Application No. 2021-576631, dated Jun. 6, 2023 with English Transition.

* cited by examiner (a) TRAINING PHASE (b) SPOOFING DETECTION PHASE

SPOOFING DETECTION APPARATUS, SPOOFING DETECTION METHOD, AND COMPUTER-READABLE STORAGE MEDIUM

This application is a National Stage Entry of PCT/JP2019/025893 filed on Jun. 28, 2019, the contents of all of which are incorporated herein by reference, in their entirety.

TECHNICAL FIELD

The present invention relates to an apparatus and a method for detection spoofing from speech, and a computer-readable storage medium storing a program for realizing these.

BACKGROUND ART

Speaker recognition refers to recognizing persons from their voice. Automatic speaker recognition (ASV) offers a flexible biometric solution to person authentication. It has been increasingly applied to forensics, telephone-based services such as telephone banking, call centers, and in many mass-market, consumer products.

However, the applicability of ASV technology depends on resilience to intentional circumvention, known as spoofing. Same as any other biometric technologies, ASV is vulnerable to spoofing. Acknowledged spoofing attacks with regards to ASV include impersonation, replay, text-to-speech speech synthesis, and voice conversion (for example, NPL1). Fraudsters can use spoofing attacks to infiltrate systems or services protected using biometric technology.

Therefore, anti-spoofing technology is required to ensure the utility of ASV in biometric authentication. Constant Q Cepstral coefficient (CQCC) features with Gaussian Mixture Model (GMM) is a standard system for spoofing detection in ASV. Recently, higher accuracy has been achieved by directly using constant Q transform (CQT) spectrograms, from which CQCC features are extracted, together with deep neural network (DNN), especially convolutional neural network (CNN).

CITATION LIST

Non Patent Literature

[NPL 1]
Galina Lavrentyeva, et al. "Audio replay attack detection with deep learning frameworks", INTERSPEECH 2017, Aug. 20-24, 2017.

SUMMARY OF INVENTION

Technical Problem

The CQT transforms a time-domain signal $x(n)$ into the time-frequency domain so that the center frequencies of the frequency bins are geometrically spaced and the quality factor Q, i.e. ratio of center frequency to the bandwidth of each window, remains constant. Therefore, CQT has better frequency resolution for low frequencies and better temporal resolution for high frequencies. CQT reflects the resolution in the human auditory system and is considered to work well in spoofing detection.

However, its high or low resolution settings sometimes cause misrecognition, especially in the case when the condition in evaluation varies from the training data.

One example of an object of the present invention is to resolve the foregoing problem and provide a spoofing detection apparatus, spoofing detection method, and a computer-readable recording medium that can suppress misrecognition by using multiple spectrograms obtained from speech in speaker spoofing detection.

Solution to Problem

In order to achieve the foregoing object, a spoofing detection apparatus according to one aspect of the present invention includes:

a multi-channel spectrogram creation means that extracts different type of spectrograms from speech data, and integrates the different type of spectrograms to create a multi-channel spectrogram, an evaluation means that evaluates the created multi-channel spectrogram by applying the created multi-channel spectrogram to a classifier constructed using labeled multi-channel spectrograms as training data and classifies it to either genuine or spoof.

In order to achieve the foregoing object, a spoofing detection method according to one aspect of the present invention includes:

(a) a step of extracting different type of spectrograms from speech data, and integrating the different type of spectrograms to create a multi-channel spectrogram, (b) a step of evaluating the created multi-channel spectrogram by applying the created multi-channel spectrogram to a classifier constructed using labeled multi-channel spectrograms as training data and classifying it to either genuine or spoof.

In order to achieve the foregoing object, a computer-readable recording medium according to still another aspect of the present invention has recorded therein a program, and the program includes an instruction to cause the computer to execute:

(a) a step of extracting different type of spectrograms from speech data, and integrating the different type of spectrograms to create a multi-channel spectrogram, (b) a step of evaluating the created multi-channel spectrogram by applying the created multi-channel spectrogram to a classifier constructed using labeled multi-channel spectrograms as training data and classifying it to either genuine or spoof.

Advantageous Effects of Invention

As described above, according to the present invention, it is possible to suppress misrecognition by using multiple spectrograms obtained from speech in speaker spoofing detection.

BRIEF DESCRIPTION OF DRAWINGS

The drawings together with the detailed description, serve to explain the principles for the inventive spoofing detection method. The drawings are for illustration and do not limit the application of the technique.

DESCRIPTION OF EMBODIMENTS

Each example embodiment of the present invention will be described below with reference to the figures. The following detailed descriptions are merely exemplary in nature and are not intended to limit the invention or the application and uses of the invention. Furthermore, there is no intention to be bound by any theory presented in the preceding background of the invention or the following detailed description.

SUMMARY OF THE INVENTION

The preset invention is to make a fusion of CQT and Fast Fourier Transform (FFT) spectrograms to work as multi-channel input in a neural network so as to complement each other and ensure the robustness of spoofing detection systems.

According to the present invention, the spoofing detection apparatus, method, and program of the present invention can provide a more accurate and robust representation of a speech utterance for spoofing detection. This is because the present invention provides a new fusion of multiple spectrograms as multi-channel spectrograms so that DNN can automatically learn effective information from all the spectrograms.

Embodiment

Figure 1:
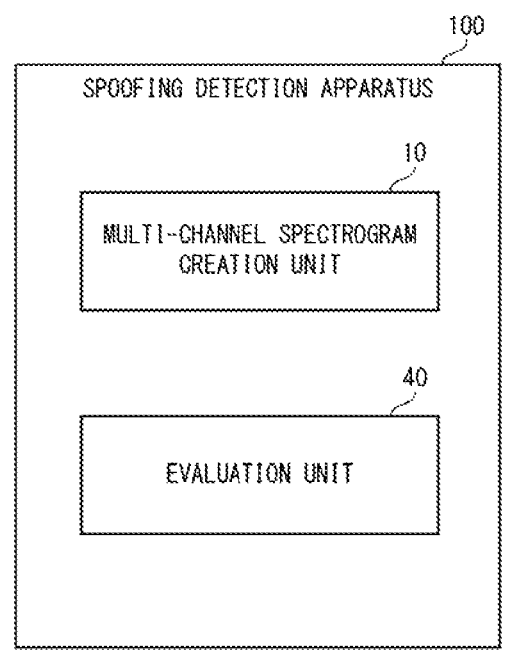
FIG. 1 is a block diagram schematically showing the configuration of the spoofing detection apparatus according to the embodiment of the present invention.

Example embodiment of the present invention are described in detail below referring to the accompanying drawings.
Device Configuration
First, a configuration of a spoofing detection apparatus 100 according to the present embodiment 1 will be described using FIG. 1. FIG. 1 is a block diagram schematically showing the configuration of the spoofing detection apparatus according to the embodiment of the present invention.

As shown in FIG. 1, the spoofing detection apparatus of the embodiment includes a multi-channel spectrogram creation unit 10 and an evaluation unit 40. The multi-channel spectrogram creation unit 10 extracts different type of spectrograms from speech data. And, the multi-channel spectrogram creation unit 10 integrates the different type of spectrograms to create a multi-channel spectrogram.

The evaluation unit evaluates the created multi-channel spectrogram by applying the generated multi-channel spectrogram to a classifier. The classifier is constructed using labeled multi-channel spectrograms as training data. The evaluation unit classifies the created multi-channel spectrogram to either genuine or spoof.

Thus, in the present embodiment, a multi-channel spectrogram obtained by integrating a plurality of types of spectrograms is applied to a classifier to perform evaluation. Therefore, according to the present embodiment, the occurrence of misrecognition is suppressed in the spoofing detection in the speaker recognition.

Figure 2:
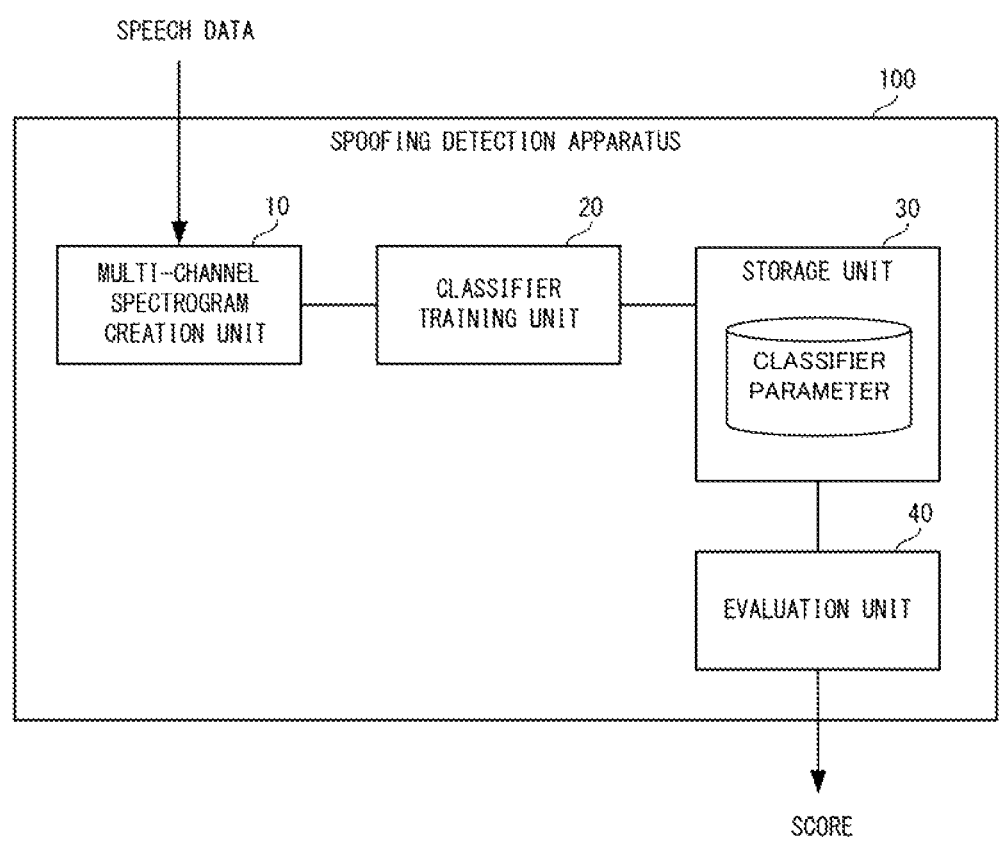
FIG. 2 depicts an exemplary block diagram illustrating the detail configuration of the spoofing detection apparatus according to the embodiment of the present invention.

Subsequently, the configuration of the spoofing detection apparatus according to the embodiment will be more specifically described with reference to FIGS. 2 to 4. FIG. 2 depicts an exemplary block diagram illustrating the detail configuration of the spoofing detection apparatus according to the embodiment of the present invention.

As shown in FIG. 2, in the present embodiment, the spoofing detection apparatus 100 further includes a classifier training unit 20 and a storage unit 30 in addition to the multi-channel spectrogram creating unit 10 and the evaluation unit 40 described above.

As described above, the multi-channel spectrogram creation unit 10 creates the multi-channel spectrogram for each speech data input. Here, the configuration of the multi-channel spectrogram creating unit 10 will be described in detail with reference to FIGS. 3 and 4.

Figure 3:
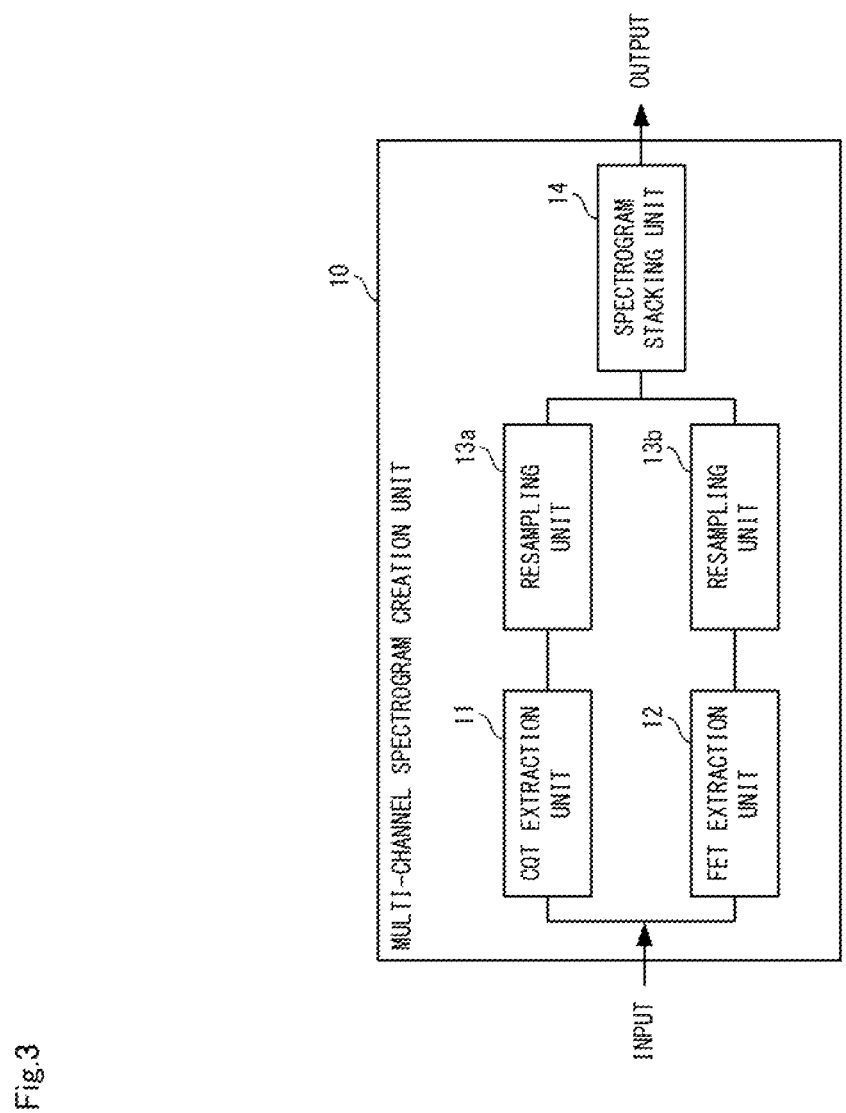
FIG. 3 is a block diagram illustrating an example of multi-channel spectrogram creation unit according to the embodiment of the present invention.

FIG. 3 is a block diagram illustrating an example of multi-channel spectrogram creation unit according to the embodiment of the present invention. In FIG. 3, the multi-channel spectrogram creation unit 10 includes a CQT extraction unit 11, an FFT extraction unit 12, a resampling unit 13a, a resampling unit 13b, and a spectrogram stacking unit 14.

The CQT extraction unit 11 extracts a CQT spectrogram from the input speech data. The FFT extraction unit 12 extracts an FFT spectrogram from the input speech data. The FFT spectrogram and the CQT spectrogram of the same speech data have the same number of frames (referred to dimensions in time) by controlling their extraction parameters.

The dimensions in frequency of FFT spectrogram and CQT spectrogram are often different from each other. The resampling unit 13a resamples the CQT spectrogram so as to have the dimension in frequency equal to a designated number. The resampling unit 13b resamples the FFT spectrogram so as to have the dimension in frequency equal to the same designated number. The designated number can be the same as the dimension in frequency of either the extracted CQT spectrogram or FFT spectrogram. In that case, the extracted spectrogram which has the dimension in frequency same as the designated number does not go through resampling unit. The spectrogram stacking unit 14 stacks the spectrograms of the same size from resampling unit 13a and 13b into 2-channel spectrograms, and outputs to next.

Figure 4:
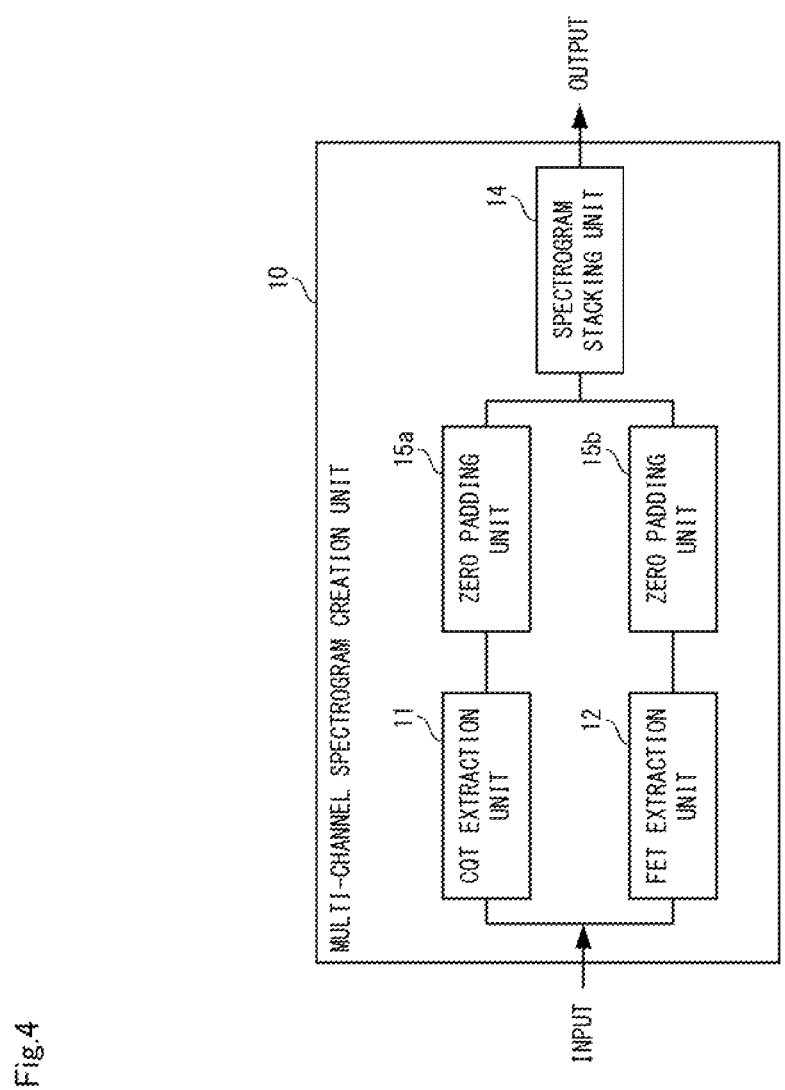
FIG. 4 is a block diagram illustrating another example of multi-channel spectrogram creation unit according to the embodiment of the present invention.

FIG. 4 is a block diagram illustrating another example of multi-channel spectrogram creation unit according to the embodiment of the present invention. In FIG. 4, the multichannel spectrogram creation unit 10 includes a CQT extraction unit 11, an FFT extraction unit, a zero padding unit 15a, a zero padding unit 15b, and a spectrogram stacking unit 14.

The CQT extraction unit 11 extracts a CQT spectrogram from the input speech data. The FFT extraction unit 12 extracts an FFT spectrogram from the input speech data. The FFT spectrogram and the CQT spectrogram have the same number of frames by controlling their extraction parameters.

The number of frequency samples of FFT spectrogram and CQT spectrogram are often different form each other. The zero padding unit 15a pads zeros, i.e., places additional zero elements, to the CQT spectrogram so as to have the dimension in frequency equal to a designated number. The zero padding unit 15b pads zeros to the FFT spectrogram so as to have the dimension in frequency equal to the same designated number. The designated number can be the same as the dimension in frequency of either the extracted CQT spectrogram or FFT spectrogram. In that case, the extracted spectrogram which has the dimension in frequency same as the designated number doesn't not go through zero padding unit. The spectrograms stacking unit 14 stacks the resampled spectrograms from 15a and 15b into 2-channel spectrograms, and output to next.

Figure 5:
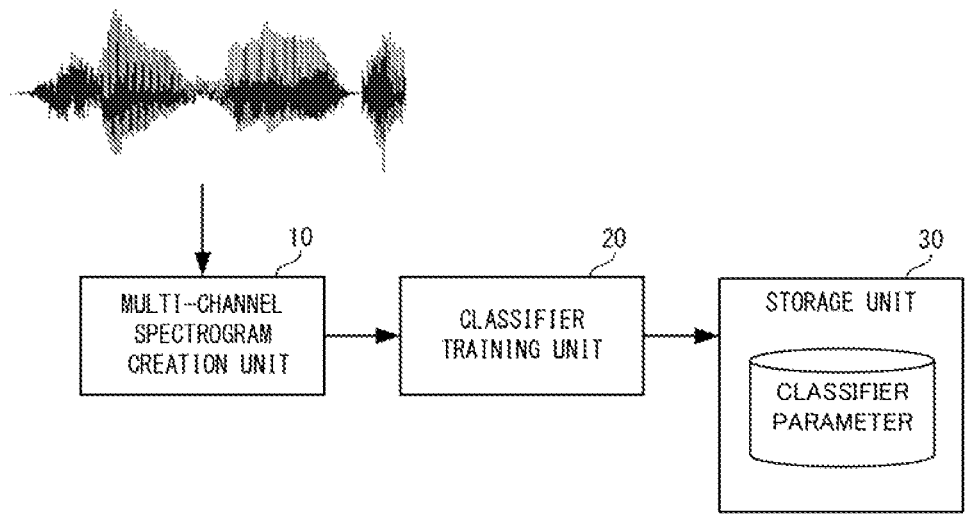
FIG. 5 is a diagram showing phases of operation of the spoofing detection apparatus according to the embodiment of the present invention, FIG. 5 (a) shows a training phase, and FIG. 5 (b) shows a spoofing detection phase.
Figure 5:
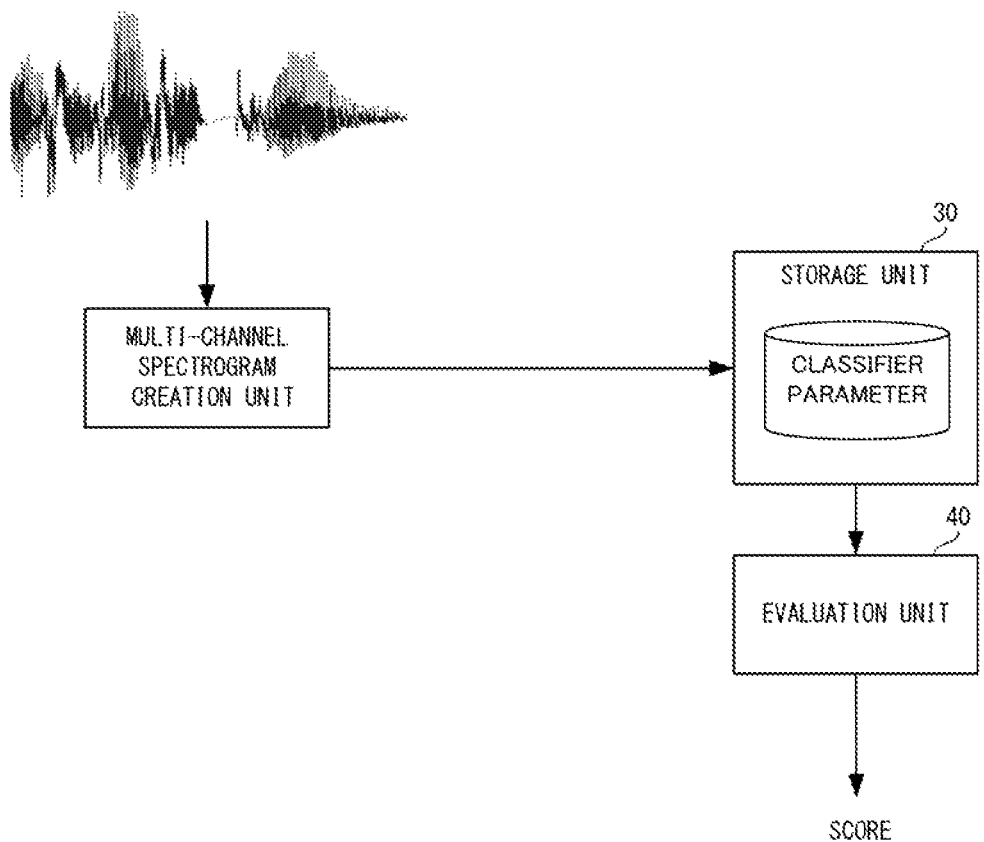

The operation of the spoofing detection apparatus in the present embodiment is composed of two phases of a training phase and a spoof detection phase. FIG. 5 is a diagram showing phases of operation of the spoofing detection apparatus according to the embodiment of the present invention, FIG. 5 (a) shows a training phase, and FIG. 5 (b) shows a spoofing detection phase.

As shown in FIG. 5, in the training phase, a classifier training unit 20 causes the multi-channel spectrogram creation unit 10 to create a multichannel spectrogram from the speech data to be sampled. Further, the classifier training unit 20 uses the created multi-channel spectrogram and a label corresponding to the speech data as training data to construct the classifier. The classifier training unit 20 stores the created classifier parameters in the storage unit 30. The details will be described below.

In the training phase in FIG. 5(a), after the multi-channel spectrograms are made by the multi-channel spectrogram creation unit 10 shown in FIG. 2 or FIG. 3, they are input into the classifier training unit 20, together with the corresponding labels of "genuine" or "spoof" as training data. The classifier training unit 20 trains a classifier, and store parameters of the learned classifier into the storage unit 30. For example, convolutional neural network (CNN) is an option of the classifier. The classifier training unit 20 computes parameters of the CNN in the storage unit 30.

In one example of CNN classifier, the CNN has one input layer, one output layer and multiple hidden layers. The output layers contain two nodes, i.e., "genuine" node and "spoof" node. To train such a CNN classifier, the classifier training unit 20 passes the multi-channel spectrograms from multi-channel spectrogram creation unit 10 to the input layer.

The classifier training unit 20 also passes the label "genuine" or "spoof" to the output layer of the CNN. Here, "genuine" and "spoof" are presented to the output layer in a form of two-dimensional vectors such as [0, 1] and [1, 0], respectively. Then it trains the CNN and obtains the parameters of hidden layers and stores them in the storage unit 30.

We can also set the number of output nodes to one, where the output can mean whether the training data is "spoof" or not. In this case, "genuine" and "spoof" are represented as a scalar 0 and 1, respectively.

In the spoofing detection phase in FIG. 5(b), the multi-channel spectrogram creation unit 10 creates a multi-channel spectrogram for the test speech data input. The two examples of the multi-channel spectrogram creations unit 10 in FIG. 3 and FIG. 4 are the same as that in the training phase. The evaluation unit 40 evaluates the multi-channel spectrogram of the testing speech data from 10 according to the pre-trained classifier whose parameters are stored in the storage unit 30, and output a spoofing score. The spoofing score is compared with a pre-determined threshold. If the score is larger, the testing data is evaluated as a "spoof" speech, otherwise, "genuine" speech.

In the example of CNN classifier, the evaluation unit 40 reads the parameters of the CNN's hidden layers from the classifier storage 30. The evaluation unit 40 passes the multi-channel spectrograms from multi-channel spectrogram creation unit 10 to the input layer. The evaluation unit 40 obtains a posterior of "spoof" node in the output layer, as a score.

Operations of Apparatus

Operations performed by the spoofing detection apparatus 100 according to the embodiment of the present invention will be described with reference to FIGS. 6 to 10. FIGS. 1 to 5 will be referenced as necessary in the following description. Also, in the first embodiment, a spoofing detection method is implemented by causing the spoofing detection apparatus to operate. Accordingly, the following description of operations performed by the spoofing detection apparatus 100 will substitute for a description of the spoofing detection method of the embodiment.

Figure 6:
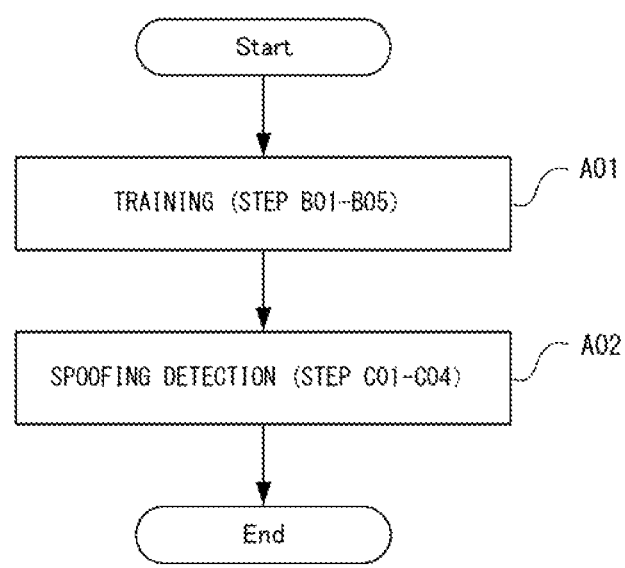
FIG. 6 depicts a flowchart illustrating an entire operation example of the spoofing detection apparatus according to the embodiment of the present invention.

An entire operation of the spoofing detection apparatus 100 according to the present embodiment will be described with reference to FIG. 6. FIG. 6 depicts a flowchart illustrating the entire operation example of the spoofing detection apparatus according to the embodiment of the present invention. As shown in FIG. 6, the entire operation of the spoofing detection apparatus 100 contains operations of a training phase (step A01) and a spoofing detection phase (step A02). However, this shows an example, the operation of the training and spoofing detection can be executed continuously or time interval can be inserted, or the operation of spoofing detection can be executed with other training operation.

First, as shown in FIG. 6, the spoofing detection apparatus 100 executes the training phase. In the training phase, the multi-channel spectrogram creation unit 10 creates a multi-channel spectrogram for each speech data input, and the classifier training unit 20 trains a classifier and stores parameters of the classifier in the classifier parameter storage 30 (step A01).

Next, the spoofing detection apparatus 100 executes the spoofing detection phase. In the spoofing detection phase, the multi-channel spectrogram creation unit 10 creates a multi-channel spectrogram for the speech data input and inputs it to the evaluation unit 40 (step A02).

Figure 7:
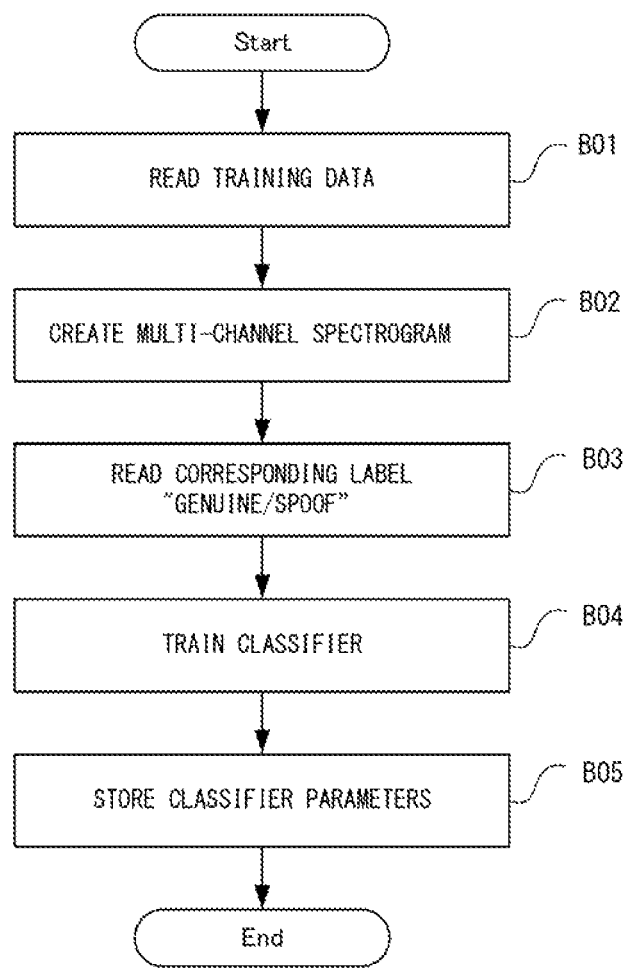
FIG. 7 depicts a flowchart showing specific operation of the training phase of the spoofing apparatus according to the embodiment of the present invention.

The training phase is specifically described with reference to FIG. 7. FIG. 7 depicts a flowchart showing specific operation of the training phase of the spoofing apparatus according to the embodiment of the present invention.

First, as shown in FIG. 7, the multi-channel spectrogram creation unit 10 reads speech data (step B01). Then, the multi-channel spectrogram creation unit 10 creates a multi-channel spectrogram from the input speech data (step B02).

Next, the classifier training unit 20 reads the corresponding label "genuine/spoof" (step B03). The classifier training unit 20 trains a classifier (step B04). Finally, the classifier training unit 20 stores the parameters of the trained classifier into the storage unit 30 (step B05).

Figure 8:
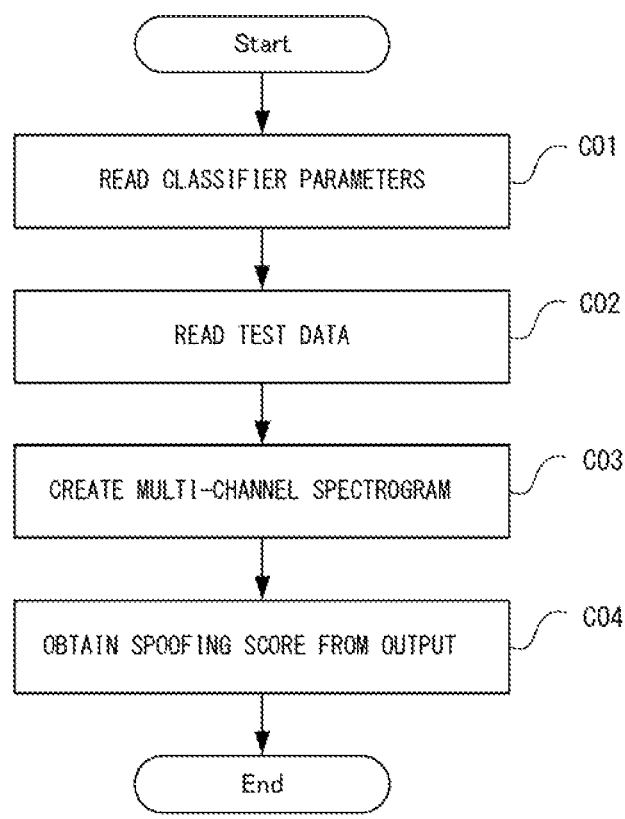
FIG. 8 is a flowchart showing specific operation of the spoofing detection phase according to the embodiment of the present invention.

The spoofing detection phase is specifically described with reference to FIG. 8. FIG. 8 is a flowchart showing specific operation of the spoofing detection phase according to the embodiment of the present invention.

First, the evaluation unit 40 reads the classifier parameters that are stored in the storage unit 30, at the training phase (step C01). Next, the multi-channel spectrogram creation unit 10 reads input speech data (step C02). Then the multi-channel spectrogram creation unit 10 creates a multi-channel spectrogram from the input speech data (step C03). Finally, the evaluation unit 40 obtains spoofing scores (C04).

The multi-channel spectrogram creation unit 10 has two examples as shown in FIG. 3 and FIG. 4. Their specific operations are illustrated in the flowchart of FIG. 9 and FIG. 10, respectively.

Figure 9:
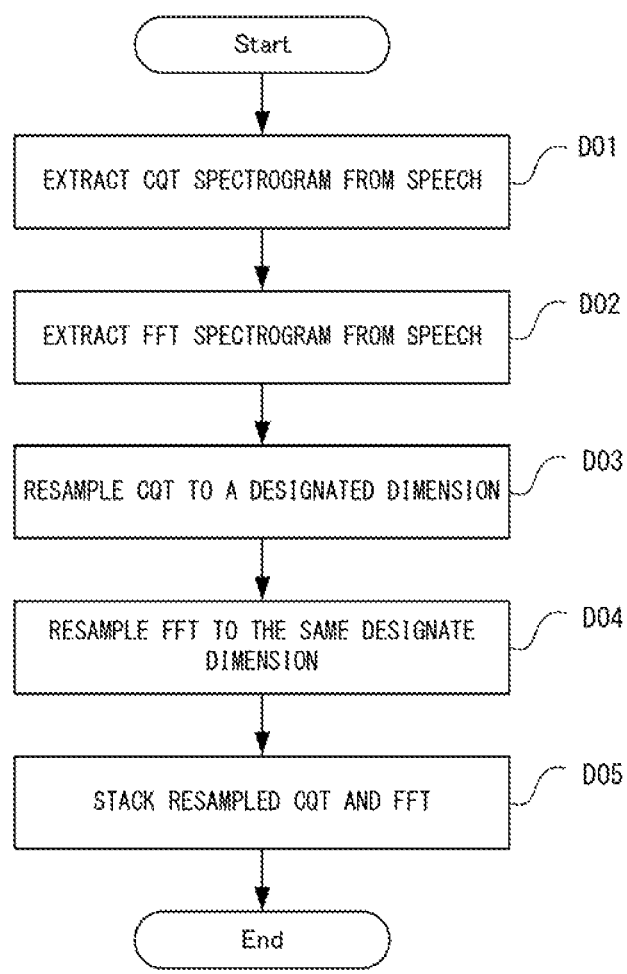
FIG. 9 depicts a flowchart illustrating an operation example of the multi-channel spectrogram creation unit according to the embodiment of the present invention.

FIG. 9 depicts a flowchart illustrating an operation example of the multi-channel spectrogram creation unit (cf. FIG. 3) according to the embodiment of the present invention. For both inputs in training phase and spoofing detection phase, the CQT extraction unit 11 extracts CQT spectrogram (step D01), and the FFT extraction unit 12 extracts FFT spectrograms (step D02).

Next, the resampling unit 13a resamples the CQT spectrogram so as to have the dimension in frequency equal to a designated dimension (step D03). Next, the resampling unit 13b resamples the FFT spectrogram so as to have the dimension in frequency equal to the designated dimension (step D04). Finally, the spectrogram stacking unit 14 stacks the resamples CQT and FFT spectrograms (step D05).

Figure 10:
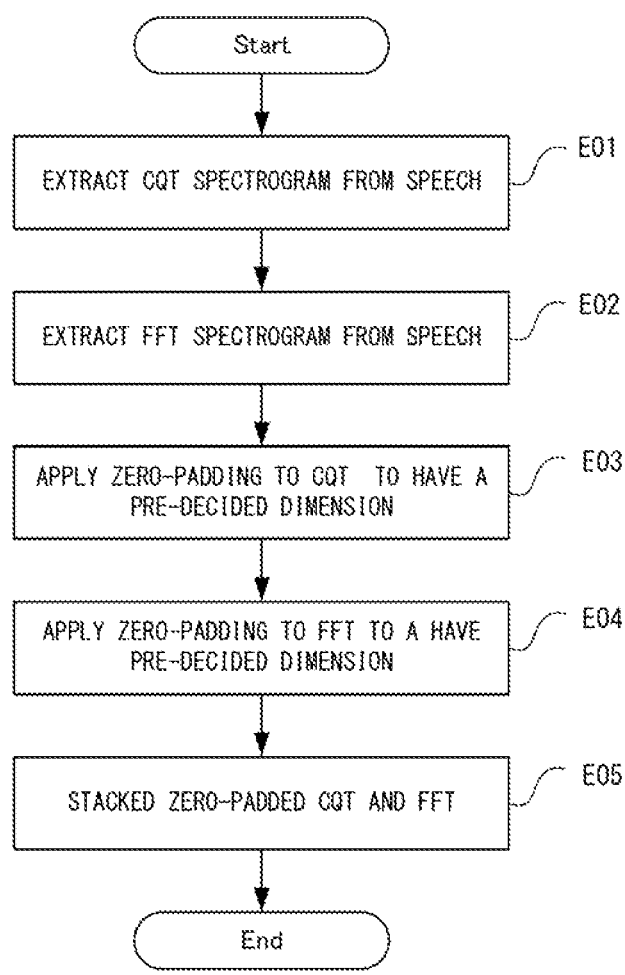
FIG. 10 depicts a flowchart illustrating another operation example of the multi-channel spectrogram creation unit according to the embodiment of the present invention.

FIG. 10 depicts a flowchart illustrating another operation example of the multi-channel spectrogram creation unit (cf. FIG. 4) according to the embodiment of the present invention. For both inputs in training phase and spoofing detection phase, the CQT extraction unit 11 extracts CQT spectrograms (step E01), and the FFT extraction unit 12 extracts FFT spectrograms (step E02).

Next, the zero padding unit 15a pads zeros to the CQT spectrogram so as to have the dimension in frequency equal to a designated dimension (step E03). The zero padding 15b pads zeros to the FFT spectrogram so as to have the dimension in frequency equal to a designated dimension (step E04). Finally, the spectrogram stacking unit 14 stacks the zero-padded CQT and FFT spectrograms (step E05).

Effect of the Example Embodiment

In this embodiment, different types of spectrograms, for example, FFT and CQT, are fused into a multi-channel 3D spectrograms, so as to complement each other. It takes the advantage of CQT that reflects the resolution in the human auditory system, but also solve its problem of lack of robustness. Thus, the embodiment of the present invention can provide a more accurate and robust representation of a speech utterance for spoofing detection.

Modified Example

The other example of the present invention is described with the same block diagram (FIG. 1-2) and flowcharts (FIG. 6-8). In this example, the multi-channel spectrogram creation unit 10 connects different types of spectrograms, instead of stacking them, thereby creating a multi-channel spectrogram. The extracted spectrograms, such as FFT and CQT, can be used directly in this example without changing their sizes.

Program

A program of the embodiment need only be a program for causing a computer to execute steps A01 to A02 shown in FIG. 6, steps B01 to B05 shown in FIG. 7, and steps C01 to C04 shown in FIG. 8. The spoofing detection apparatus 100 and the spoofing detection method according to the embodiment of the present invention can be realized by installing the program on a computer and executing it. In this case, the processor of the computer functions as the multi-channel spectrogram creating unit 10, the classifier training unit 20, and the evaluation unit 40, and performs processing.

The program according to the embodiment of the present invention may be executed by a computer system constructed using a plurality of computers. In this case, for example, each computer may function as a different one of the multi-channel spectrogram creating unit 10, the classifier training unit 20, and the evaluation unit 40.

Physical Configuration

Figure 11:
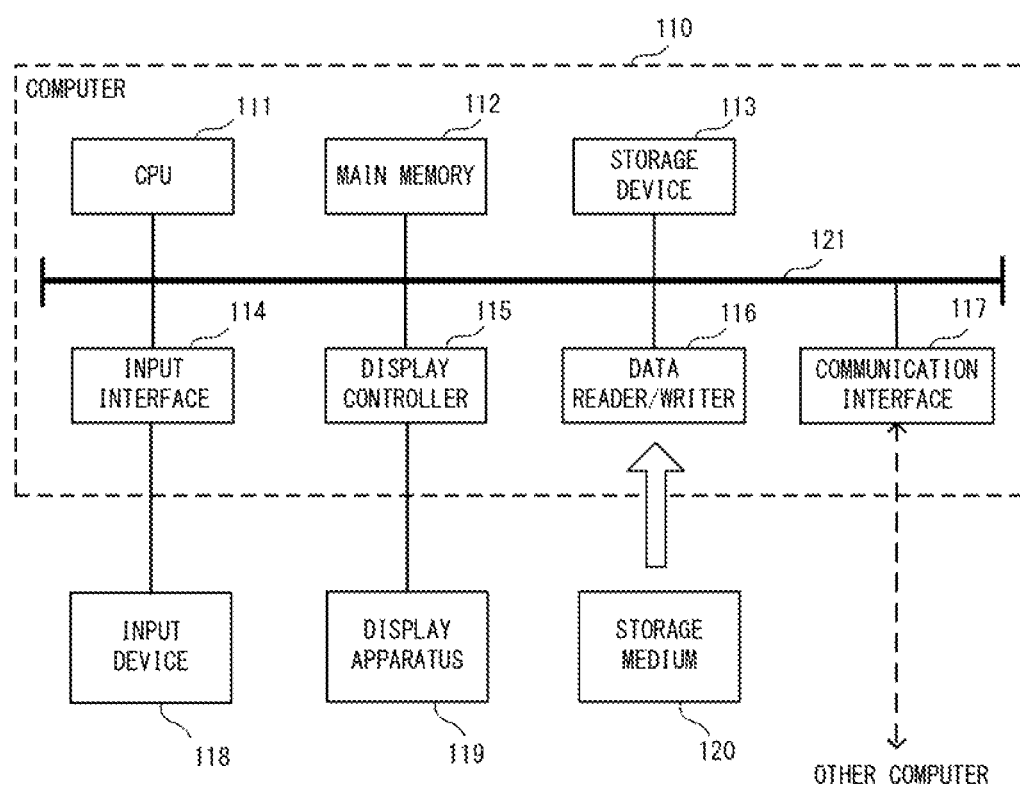
FIG. 11 is a block diagram showing an example of a computer that realizes the spoofing detection apparatus according to the embodiment of the present invention.

The following describes a computer that realizes the spoofing detection apparatus by executing the program of the embodiment, with reference to FIG. 11. FIG. 11 is a block diagram showing an example of a computer that realizes the spoofing detection apparatus according to the embodiment of the present invention.

As shown in FIG. 11, the computer 110 includes a CPU (Central Processing Unit) 111, a main memory 112, a storage device 113, an input interface 114, a display controller 115, a data reader/writer 116, and a communication interface 117. These units are connected via a bus 121 so as to be capable of mutual data communication. The computer 110 may include a graphics processing unit (GPU) or a field-programmable gate array (FPGA) in addition to or instead of the CPU 111.

The CPU 111 carries out various calculations by expanding programs (codes) according to the present embodiment, which are stored in the storage device 113, to the main memory 112 and executing them in a predetermined sequence. The main memory 112 is typically a volatile storage device such as a DRAM (Dynamic Random-Access Memory). Also, the program according to the present embodiment is provided in a state of being stored in a computer-readable storage medium 120. Note that the program according to the present embodiment may be distributed over the Internet, which is connected to via the communication interface 117.

Also, specific examples of the storage device 113 include a semiconductor storage device such as a flash memory, in addition to a hard disk drive. The input interface 114 mediates data transmission between the CPU 111 and an input device 118 such as a keyboard or a mouse. The display controller 115 is connected to a display device 119 and controls display on the display device 118.

The data reader/writer 116 mediates data transmission between the CPU 111 and the storage medium 120, reads out programs from the storage medium 120, and writes results of processing performed by the computer 110 in the storage medium 120. The communication interface 17 mediates data transmission between the CPU 111 and another computer.

Also, specific examples of the storage medium 120 include a general-purpose semiconductor storage device such as CF (Compact Flash (registered trademark)) and SD (Secure Digital), a magnetic storage medium such as a flexible disk, and an optical storage medium such as a CD-ROM (Compact Disk Read Only Memory).

The spoofing detection apparatus 100 according to the present exemplary embodiment can also be realized using items of hardware corresponding to various components, rather than using the computer having the program installed therein. Furthermore, a part of the spoofing detection apparatus 100 may be realized by the program, and the remaining part of the spoofing detection apparatus 100 may be realized by hardware.

The above-described embodiment can be partially or entirely expressed by, but is not limited to, the following Supplementary Notes 1 to 21.

(Supplementary Note 1)

A spoofing detection apparatus comprising:

a multi-channel spectrogram creation means that extracts different type of spectrograms from speech data, and integrates the different type of spectrograms to create a multi-channel spectrogram, an evaluation means that evaluates the created multi-channel spectrogram by applying the created multi-channel spectrogram to a classifier constructed using labeled multi-channel spectrograms as training data and classifies it to either genuine or spoof.

(Supplementary Note 2)

The spoofing detection apparatus according to supplementary note 1, further comprising a classifier training means that causes the multi-channel spectrogram creation means to create a multichannel spectrogram from the speech data to be sampled and uses the created multi-channel spectrogram and a label corresponding to the speech data as training data to construct the classifier.

(Supplementary Note 3)

The spoofing detection apparatus according to supplementary note 1 or 2,

Wherein the multi-channel spectrogram creation means integrates the different type of spectrograms by stacking them.

(Supplementary Note 4)

The spoofing detection apparatus according to supplementary note 1 or 2,

Wherein the multi-channel spectrogram creation means integrates the different type of spectrograms by concatenating them.

(Supplementary Note 5)

The spoofing detection apparatus according to any of supplementary notes 1 to 4, Wherein the multi-channel spectrogram creation means resamples the different types of spectrograms into the same size before creating the multi-channel spectrograms.

(Supplementary Note 6)

The spoofing detection apparatus according to any of supplementary notes 1 to 4, Wherein the multi-channel spectrogram creation means zero-pads the different types of spectrograms into the same size before creating the multi-channel spectrograms.

(Supplementary Note 7)

The spoofing detection apparatus according to any of supplementary notes 1 to 6, Wherein the different types of spectrograms include an FFT spectrogram and a CQT spectrogram.

(Supplementary Note 8)

A spoofing detection method comprising:

(a) a step of extracting different type of spectrograms from speech data, and integrating the different type of spectrograms to create a multi-channel spectrogram, (b) a step of evaluating the created multi-channel spectrogram by applying the created multi-channel spectrogram to a classifier constructed using labeled multi-channel spectrograms as training data and classifying it to either genuine or spoof (Supplementary Note 9)

The spoofing detection method according to supplementary note 8, further comprising (c) a step of causing the multi-channel spectrogram creation means to create a multichannel spectrogram from the speech data to be sampled and uses the created multi-channel spectrogram and a label corresponding to the speech data as training data to construct the classifier.

(Supplementary Note 10)

The spoofing detection method according to supplementary note 8 or 9,

Wherein in the step (a), integrating the different type of spectrograms by stacking them.

(Supplementary Note 11)

The spoofing detection method according to supplementary note 8 or 9,

Wherein in the step (a), integrating the different type of spectrograms by concatenating them.

(Supplementary Note 12)

The spoofing detection method according to any of supplementary notes 8 to 11,

Wherein in the step (a), resampling the different types of spectrograms into the same size before creating the multi-channel spectrograms.

(Supplementary Note 13)

The spoofing detection method according to any of supplementary notes 8 to 11,

Wherein in the step (a), zero-padding the different types of spectrograms into the same size before creating the multi-channel spectrograms.

(Supplementary Note 14)

The spoofing detection method according to any of supplementary notes 8 to 13,

Wherein in the step (a), the different types of spectrograms include an FFT spectrogram and a CQT spectrogram.

(Supplementary Note 15)

A computer-readable storage medium storing a program that includes commands for causing a computer to execute:

(a) a step of extracting different type of spectrograms from speech data, and integrating the different type of spectrograms to create a multi-channel spectrogram, (b) a step of evaluating the created multi-channel spectrogram by applying the created multi-channel spectrogram to a classifier constructed using labeled multi-channel spectrograms as training data and classifying it to either genuine or spoof (Supplementary Note 16)

The computer-readable storage medium according to supplementary note 15,

Wherein the program further includes commands causing the computer to execute (c) a step of causing the multi-channel spectrogram creation means to create a multichannel spectrogram from the speech data to be sampled and uses the created multi-channel spectrogram and a label corresponding to the speech data as training data to construct the classifier.

(Supplementary Note 17)

The computer-readable storage medium according to supplementary note 15 or 16,

Wherein in the step (a), integrating the different type of spectrograms by stacking them.

(Supplementary Note 18)

The computer-readable storage medium according to supplementary note 15 or 16,

Wherein in the step (a), integrating the different type of spectrograms by concatenating them.

(Supplementary Note 19)
The computer-readable storage medium according to any of supplementary notes 15 to 18,
Wherein in the step (a), resampling the different types of spectrograms into the same size before creating the multi-channel spectrograms.
(Supplementary Note 20)
The computer-readable storage medium according to any of supplementary notes 15 to 18,
Wherein in the step (a), zero-padding the different types of spectrograms into the same size before creating the multi-channel spectrograms.
(Supplementary Note 21)
The computer-readable storage medium according to any of supplementary notes 15 to 20,
Wherein in the step (a), the different types of spectrograms include an FFT spectrogram and a CQT spectrogram.

Although the invention of the present application has been described above with reference to the embodiment, the invention of the present application is not limited to the above embodiment. Various changes that can be understood by a person skilled in the art can be made to the configurations and details of the invention of the present application within the scope of the invention of the present application.

INDUSTRIAL APPLICABILITY

As described above, according to the present invention, it is possible to suppress misrecognition by using multiple spectrograms obtained from speech in speaker spoofing detection. The present invention is useful in fields, e.g. speaker verification.

REFERENCE SIGNS LIST 10 multi-channel spectrogram creating unit
11 CQT extraction unit
12 FFT extraction unit
13a resampling unit
13b resampling unit
14 spectrogram stacking unit.
15a zero padding unit
15b zero padding unit
20 classifier training unit
30 storage unit
40 evaluation unit
100 spoofing detection apparatus
110 Computer
111 CPU
112 Main memory
113 Storage device
114 Input interface
115 Display controller
116 Data reader/writer
117 Communication interface
118 Input device
119 Display apparatus
120 Storage medium
121 Bus

What is claimed is:

1. A spoofing detection apparatus comprising:
one or more processors; and
a memory storing instructions executable by the one or more processors to:
extract different types of spectrograms, including FFT spectrograms and CQT spectrograms, from speech data, and integrate the different types of spectrograms to create a multi-channel 3D spectrogram by fusing different types of spectrograms into the created multi-channel 3D spectrogram; and
evaluate the created multi-channel 3D spectrogram by applying the created multi-channel 3D spectrogram to a classifier constructed using labeled multi-channel spectrograms as training data and classify the created multi-channel 3D spectrogram as either genuine or spoof, wherein
the CQT spectrograms have additional zero elements placed therein, and the FFT spectrograms are zero-padded, so as to have a dimension in frequency equal to a same designated number that is equal to the dimension in frequency of either the CQT spectrograms as extracted or the FFT spectrograms as extracted.

2. The spoofing detection apparatus according to claim 1, wherein
the created multi-channel 3D spectrogram and a label corresponding to the speech data are used as the training data to construct the classifier.

3. The spoofing detection apparatus according to claim 1, wherein the different type of spectrograms are integrated by stacking.

4. The spoofing detection apparatus according to claim 1, wherein the different type of spectrograms are integrated by concatenation.

5. The spoofing detection apparatus according to claim 1, wherein the different types of spectrograms are resampled into a same size before the multi-channel 3D spectrogram is created.

6. The spoofing detection apparatus according to claim 1, wherein the different types of spectrograms are zero-padded into a same size before the multi-channel 3D spectrogram is created.

7. A spoofing detection method comprising:
extracting, by a processor, different types of spectrograms, including FFT spectrograms and CQT spectrograms, from speech data, and integrating the different types of spectrograms to create a multi-channel 3D spectrogram by fusing different types of spectrograms into the created multi-channel 3D spectrogram; and
evaluating, by the processor, the created multi-channel 3D spectrogram by applying the created multi-channel 3D spectrogram to a classifier constructed using labeled multi-channel spectrograms as training data and classifying the created multi-channel 3D spectrogram as either genuine or spoof, wherein
the CQT spectrograms have additional zero elements placed therein, and the FFT spectrograms are zero-padded, so as to have a dimension in frequency equal to a same designated number that is equal to the dimension in frequency of either the CQT spectrograms as extracted or the FFT spectrograms as extracted.

8. A non-transitory computer-readable storage medium storing a program that includes commands for causing a computer to execute:
extracting different types of spectrograms, including FFT spectrograms and CQT spectrograms, from speech data, and integrating the different types of spectrograms to create a multi-channel 3D spectrogram by fusing different types of spectrograms into the created multi-channel 3D spectrogram; and
evaluating the created multi-channel 3D spectrogram by applying the created multi-channel 3D spectrogram to a classifier constructed using labeled multi-channel spectrograms as training data and classifying the created multi-channel 3D spectrogram as either genuine or spoof, wherein the CQT spectrograms have additional zero elements placed therein, and the FFT spectrograms are zero-padded, so as to have a dimension in frequency equal to a same designated number that is equal to the dimension in frequency of either the CQT spectrograms as extracted or the FFT spectrograms as extracted.

9. The spoofing detection method according to claim 7, wherein the created multi-channel 3D spectrogram and a label corresponding to the speech data are used as the training data to construct the classifier.

10. The spoofing detection method according to claim 7, wherein the different type of spectrograms are integrated by stacking.

11. The spoofing detection method according to claim 7, wherein the different type of spectrograms are integrated by concatenation.

12. The spoofing detection method according to claim 7, wherein the different types of spectrograms are resampled into a same size before the multi-channel 3D spectrogram is created.

13. The spoofing detection method according to claim 7, wherein the different types of spectrograms are zero-padded into a same size before the multi-channel 3D spectrogram is created.

14. The non-transitory computer-readable storage medium according to claim 8, wherein the created multi-channel 3D spectrogram and a label corresponding to the speech data are used as the training data to construct the classifier.

15. The non-transitory computer-readable storage medium according to claim 8, wherein, the different type of spectrograms are integrated by stacking-.

16. The non-transitory computer-readable storage medium according to claim 8, wherein, the different type of spectrograms are integrated by concatenation.

17. The non-transitory computer-readable storage medium according to claim 8, wherein, the different types of spectrograms are resampled into a same size before the multi-channel 3D spectrogram is created.

18. The non-transitory computer-readable storage medium according to claim 8, wherein the different types of spectrograms are zero-padded into a same size before creating the multi-channel 3D spectrogram is created.

* * * * *